United States Patent
Eck et al.

(10) Patent No.: US 7,992,546 B2
(45) Date of Patent: Aug. 9, 2011

(54) DELIVERY UNIT FOR DELIVERING FUEL

(75) Inventors: Karl Eck, Frankfurt (DE); Dieter Hagist, Lahnstein (DE); Matthias Kadler, Gross-Gerau (DE); Martin Maasz, Sulzbach (DE); Oliver Schönert, Arnsberg (DE); Michael Teichert, Schwalbach (DE)

(73) Assignee: Continental Automotive GmbH, Hannover (DE)

( * ) Notice: Subject to any disclaimer, the term of this patent is extended or adjusted under 35 U.S.C. 154(b) by 67 days.

(21) Appl. No.: 12/309,250

(22) PCT Filed: Jul. 10, 2007

(86) PCT No.: PCT/EP2007/057001
§ 371 (c)(1),
(2), (4) Date: Feb. 23, 2009

(87) PCT Pub. No.: WO2008/006813
PCT Pub. Date: Jan. 17, 2008

(65) Prior Publication Data
US 2009/0255515 A1    Oct. 15, 2009

(30) Foreign Application Priority Data
Jul. 11, 2006    (DE) .................. 10 2006 032 101

(51) Int. Cl.
*F02M 37/08*    (2006.01)
*F02M 37/04*    (2006.01)

(52) U.S. Cl. ...................................... 123/509

(58) Field of Classification Search .................. 123/509, 123/514, 497, 495; 417/423.3; 137/565.01, 137/565.13; 210/416.4
See application file for complete search history.

(56) References Cited

U.S. PATENT DOCUMENTS

| | | | |
|---|---|---|---|
| 4,546,750 | A | 10/1985 | Brunell et al. |
| 4,974,570 | A | 12/1990 | Swargulski et al. |
| 5,392,750 | A | 2/1995 | Laue et al. |
| 5,415,146 | A | 5/1995 | Tuckey |
| 5,566,543 | A | 10/1996 | Taylor et al. |
| 5,647,329 | A | 7/1997 | Bucci et al. |
| 5,699,773 | A * | 12/1997 | Kleppner et al. ............. 123/510 |
| 5,900,140 | A | 5/1999 | Nagai et al. |
| 6,267,103 | B1 | 7/2001 | Ludwig et al. |
| 6,283,731 | B1 * | 9/2001 | Yoshioka .................. 417/423.3 |
| 6,453,883 | B2 | 9/2002 | Schreckenberger |
| 6,551,509 | B2 | 4/2003 | Appleton |
| 7,198,035 | B2 | 4/2007 | Kadler et al. |
| 7,285,213 | B2 * | 10/2007 | Barz ......................... 210/416.4 |
| 7,299,821 | B2 * | 11/2007 | Briggs et al. .................. 137/574 |
| 7,350,509 | B2 | 4/2008 | Barz et al. |
| 2003/0188786 | A1 | 10/2003 | Toki et al. |
| 2003/0206814 | A1 * | 11/2003 | Djordjevic .................... 417/313 |
| 2005/0133428 | A1 | 6/2005 | Peet et al. |

(Continued)

FOREIGN PATENT DOCUMENTS
DE    42 42 242    6/1994
(Continued)

*Primary Examiner* — Mahmoud Gimie
(74) *Attorney, Agent, or Firm* — Cohen Pontani Lieberman & Pavane LLP

(57) ABSTRACT

A delivery unit for delivering fuel in a fuel tank comprises a prefilter and swirl pot which are produced as one piece. The prefilter is produced during die-casting of the swirl pot. The invention allows the delivery unit to be produced in an especially inexpensive manner.

12 Claims, 4 Drawing Sheets

U.S. PATENT DOCUMENTS

| | | |
|---|---|---|
| 2006/0011172 A1* | 1/2006 | Kadler et al. ............... 123/509 |
| 2006/0070941 A1* | 4/2006 | Cline et al. ............... 210/416.4 |
| 2007/0084784 A1 | 4/2007 | Wehrun |
| 2008/0127948 A1 | 6/2008 | Braun et al. |

FOREIGN PATENT DOCUMENTS

| | | |
|---|---|---|
| DE | 19619992 A1 | 11/1997 |
| DE | 19744361 A1 | 3/1999 |
| DE | 19834653 C1 | 12/1999 |
| DE | 198 37 954 | 1/2000 |
| DE | 29922473 U1 | 5/2001 |
| DE | 10004357 A1 | 8/2001 |
| DE | 19727470 C2 | 1/2002 |
| DE | 102004021919 A1 | 12/2005 |
| DE | 102004034842 A1 | 3/2006 |
| WO | WO 0157387 A1 | 8/2001 |
| WO | WO 2005/051699 | 6/2005 |
| WO | WO2005/051699 A1 | 6/2005 |
| WO | WO 2005085623 A1 | 9/2005 |

\* cited by examiner

DELIVERY UNIT FOR DELIVERING FUEL

PRIORITY CLAIM

This is a U.S. national stage of application No. PCT/EP2007/057001, filed on 10 Jul. 2007, which claims Priority to the German Application No.: 10 2006 032 101.4, filed: 11 Jul. 2006; the content of both being incorporated here by reference.

BACKGROUND OF THE INVENTION

1. Field of the Invention

The invention relates to a delivery unit for delivering fuel in a fuel tank of a motor vehicle, with a swirl pot for collecting the fuel and with a prefilter for filtering fuel sucked up from the swirl pot.

2. Description of the Prior Art

Delivery units of this type are frequently used in fuel tanks nowadays and are known from practice. The prefilter is frequently designed as a separate component and is fitted onto the swirl pot or onto a fuel pump sucking up fuel from the swirl pot. This leads to complicated manufacturing and installation of the prefilter. Furthermore, the prefilter can fit snugly against components of the fuel pump or of the swirl pot and thereby restrict the useable filter surface. In addition, slender filters increase the risk of air being sucked up.

SUMMARY OF THE INVENTION

The invention is based on the problem of developing a delivery unit of the type mentioned at the beginning in such a manner that it can be manufactured particularly cost-effectively.

This problem is solved according to one embodiment of the invention in that the prefilter is arranged within the swirl pot and is connected to the swirl pot with a cohesive material joint or is manufactured as one piece with the swirl pot.

By means of this configuration, the prefilter together with the swirl pot according to the invention forms a constructional unit which can be fitted with other components, such as the fuel pump. Owing to the invention, separate installation of the prefilter is not required. Furthermore, the prefilter is kept in its designated position by being fastened to the casing of the swirl pot according to the invention. Therefore, snug fitting of the prefilter against adjacent components is largely avoided. The fastening of the prefilter to the casing of the swirl pot with a cohesive material joint can be produced, for example, by the prefilter being inserted as an insert into an injection mold provided for manufacturing the swirl pot. During the subsequent injection molding operation, the prefilter is encapsulated by the plastic of the swirl pot. The swirl pot is manufactured as one piece with the prefilter, for example by the injection mold being appropriately shaped.

Bending or snug fitting of the prefilter against adjacent components of the delivery unit according to one embodiment of the invention can be avoided in a simple manner if the prefilter is designed as a deformation-resistant element. The deformation-resistant unit of the prefilter can be achieved by means of corresponding stability or by means of a stress in the swirl pot.

The manufacturing of the delivery unit according to one embodiment of the invention is simplified if a casing of the swirl pot is taken as far as a base plate, and if the prefilter at least partially covers the base plate. This configuration preferably results in the production of a collecting chamber which is arranged between the prefilter and the base plate and from which fuel is sucked up.

The manufacturing of the delivery unit according to one embodiment of the invention is further simplified if the base plate is fastened to the casing in a sealing manner. This configuration enables the base plate to be manufactured as a separate component. The casing of the swirl pot can therefore be manufactured together with the prefilter as a component which can be removed from the mold axially, and said casing can be connected to the base plate in a following manufacturing step.

The manufacturing of the delivery unit according to one embodiment of the invention is further simplified if the prefilter is arranged transversely in the casing. This contributes to the casing together with the prefilter being able to be removed from the mold in a simple manner axially. Furthermore, the delivery unit according to the invention has a particularly small construction space as a result.

The manufacturing of the prefilter together with the swirl pot as one piece turns out to be particularly cost-effective, according to one embodiment of the invention, if the prefilter has webs arranged inclined with respect to each other on both sides, and if the webs of the opposite sides merge into each other in order to form meshes of the prefilter. Said webs can be produced by grooves in mutually opposite mold parts of the injection mold. The grooves in the mold parts are pressed against each other. As a result, the meshes of the prefilter are produced at the contact points of the mold parts.

The manufacturing costs of the delivery unit according to one embodiment of the invention are further reduced if a housing of a fine filter is manufactured as one piece with the casing and is closed by the base plate.

The dimensions of the delivery unit according to one embodiment of the invention are reduced with the prefilter maintaining a large filter surface if the prefilter surrounds the housing of the fine filter.

The delivery unit according to one embodiment of the invention has a particularly high degree of stability and can be manufactured cost-effectively if stiffening ribs which are arranged on the housing of the fine filter and are manufactured as one piece with the housing are arranged parallel to the casing. By this means, the constructional unit comprising casing, prefilter and fine filter can be manufactured in a simple manner in an injection mold from which the unit can be removed axially.

The manufacturing costs of the delivery unit according to one embodiment of the invention are further reduced if the prefilter surrounds connectors and supporting elements for holding components arranged within the swirl pot. The prefilter also has a particularly large surface area as a result.

BRIEF DESCRIPTION OF THE DRAWINGS

The invention permits numerous embodiments. To further clarify its basic principle, one of said embodiments is illustrated in the drawing and is described below. In the drawing

DETAILED DESCRIPTION OF THE PRESENTLY PREFERRED EMBODIMENTS

Figure 1:
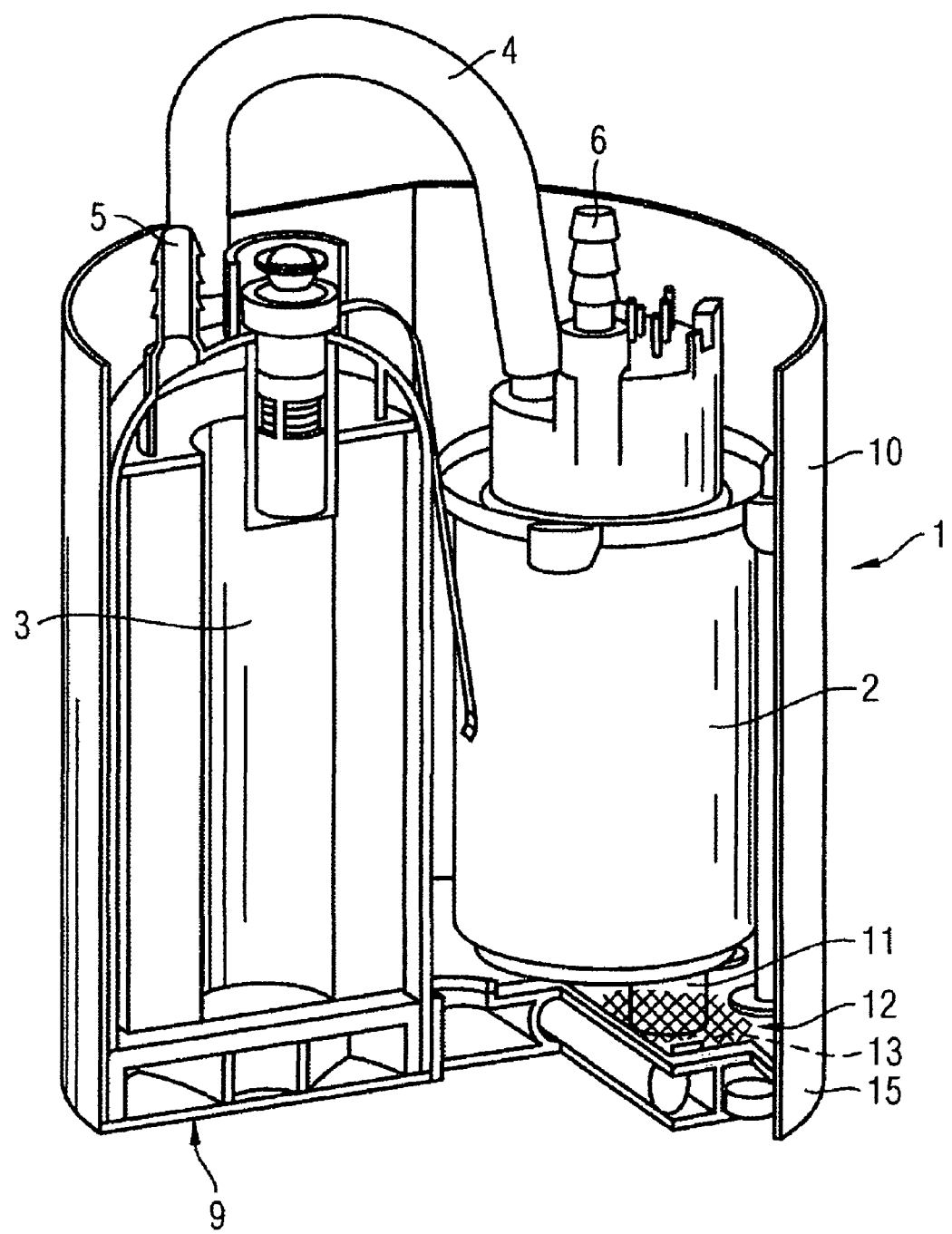
FIG. 1 is a partial section through a delivery unit according to the invention.

FIG. 1 shows a delivery unit for delivering fuel in a fuel tank of a motor vehicle to an internal combustion engine (not illustrated) of the motor vehicle. The device has a fuel pump 2 which is arranged in a swirl pot 1 and is driven by an electric motor, and a fine filter 3. The fine filter 3 is likewise arranged in the swirl pot 1 and is connected to the fuel pump 2 via a fuel line 4. Furthermore, the fine filter 3 has a connecting piece 5 for a feed line (not illustrated) leading to the internal combustion engine of the fuel tank. A line 7 (illustrated in FIG. 2) for a suction jet pump 8 is connected to a connection 6 of the fuel pump 2. The suction jet pump 8 sucks up fuel from the surroundings of the swirl pot 1 and delivers said fuel into the swirl pot 1. The swirl pot 1 serves to collect the fuel and has a base plate 9 and a casing 10 connected to the base plate 9 in a sealing manner. An intake pipe 11 of the fuel pump 2 projects through a prefilter 12 into a collecting chamber 13 of the base plate 9. Fuel flowing into the swirl pot 1 passes via the prefilter 12 into the collecting chamber 13 and therefore to the intake pipe 11 of the fuel pump 2. The fuel pump 2 is therefore capable of sucking up fuel from the swirl pot 1 and of delivering said fuel via the fine filter 3 to the connecting piece 5 for the feed line. The casing 10 of the swirl pot 1 has an edge 15 which engages over a supporting edge 14 of the base plate 9. The edge 15 and the supporting edge 14 are connected to each other in a sealing manner.

Figure 2:
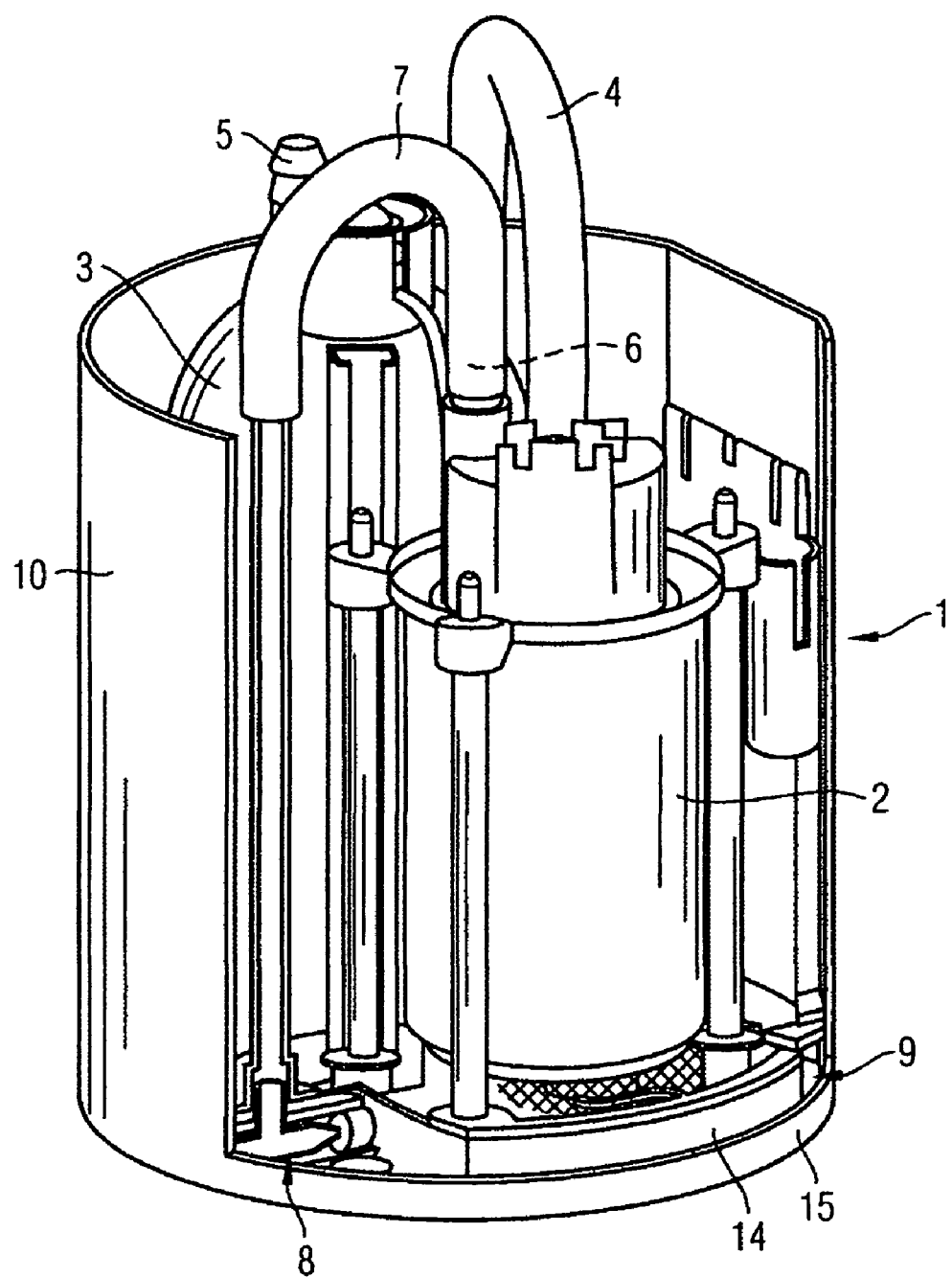
FIG. 2 is second partial section of the delivery unit according to the invention, which partial section is offset with respect to the partial section from FIG. 1.
Figure 3:
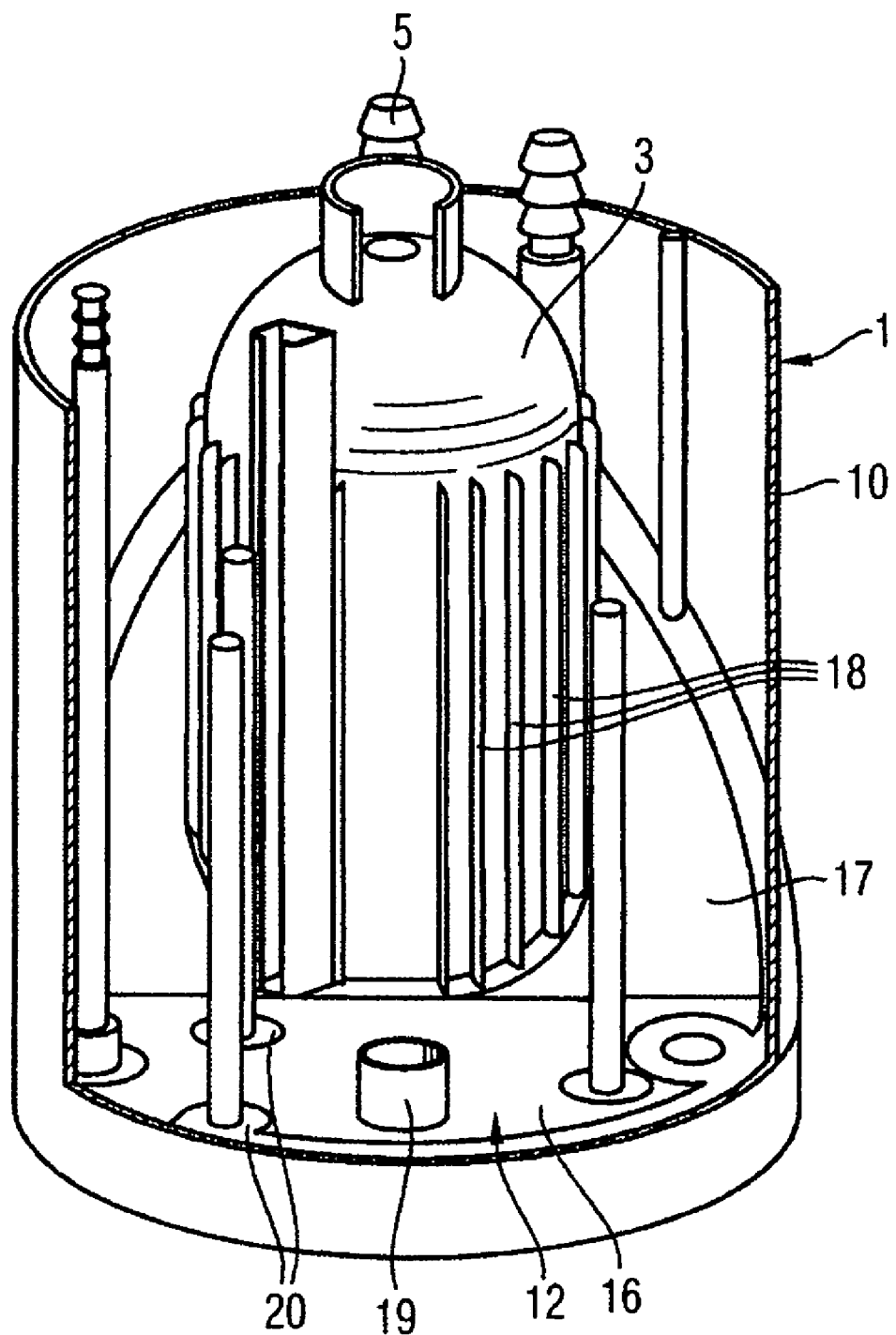
FIG. 3 is, in partial section, a perspective illustration of a swirl pot of the device according to the invention with a prefilter.

FIG. 3 shows the swirl pot 1 from FIG. 1 in a partial section. It can be seen here that the prefilter 12 has a horizontal portion 16 and a portion 17 which protrudes from the horizontal plane, and said prefilter is connected to the casing 10 of the swirl pot 1 with a cohesive material joint or is manufactured as one piece with the casing 10 of the swirl pot. The prefilter 12 is manufactured as one piece and is encapsulated by plastic of the swirl pot 1. That portion 17 of the prefilter 12 which protrudes from the horizontal plane is inclined with respect to the vertical. Stiffening ribs 18 arranged on the fine filter 3 are arranged parallel to the casing 10 of the swirl pot 1 and are manufactured as one piece with the fine filter 3. The fine filter 3 is partially enclosed by the prefilter 12. Furthermore, connectors 19 and supporting elements 20 for holding and for connecting components which are arranged within the swirl pot 1 and as described in FIGS. 1 and 2 are surrounded by the prefilter 12.

Figure 4:
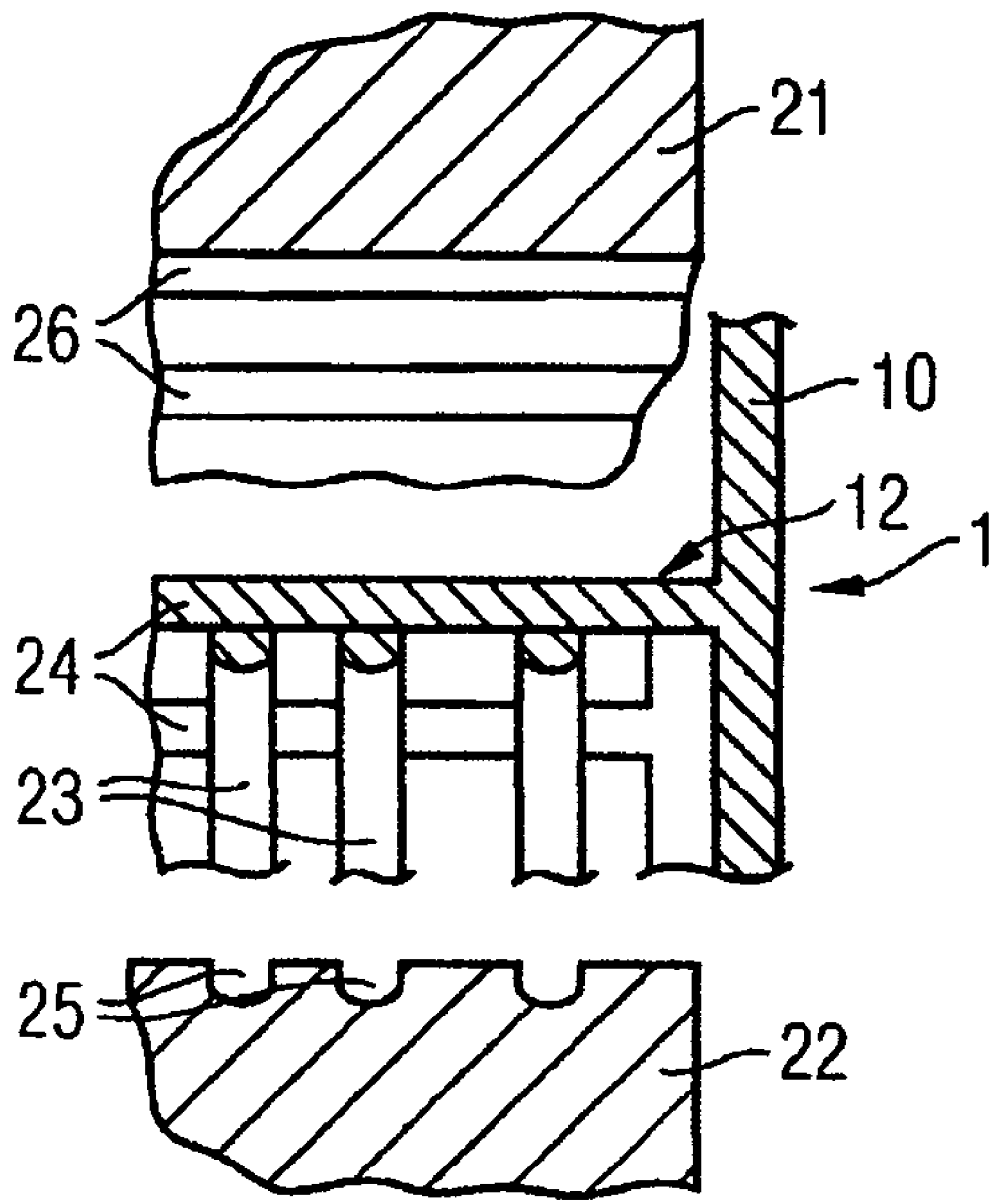
FIG. 4 is, on a greatly enlarged scale, a partial region of the swirl pot from FIG. 1 with two mold parts of an injection mold.

FIG. 4 shows a sectional illustration through a partial region of the swirl pot 1 with the prefilter 12 and with two mold parts 21, 22 of an injection mold for manufacturing the swirl pot 1 as one piece with the prefilter 12. The prefilter 12 has webs 23, 24 which are arranged offset with respect to each other on both sides and are connected to each other at the intersecting points. The webs 23, 24 are produced by grooves 25, 26 arranged in the mold parts 21, 22. The prefilter 12 therefore has a lattice-like structure and is therefore designed as a deformation-resistant element.

In an alternative embodiment (not illustrated), the prefilter 12 can be inserted into an injection mold and encapsulated by the plastic during the manufacturing of the swirl pot 1. The prefilter 12 is therefore connected to the swirl pot 1 with a cohesive material joint.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A delivery unit for delivering fuel in a fuel tank of a motor vehicle, comprising:
   a swirl pot for collecting and retaining the fuel, the swirl pot delineated by a casing;
   a prefilter for filtering fuel drawn up from the swirl pot, wherein the prefilter is arranged within the swirl pot and is one of coupled to the swirl pot with a cohesive material joint and manufactured as one piece with the swirl pot.

2. The delivery unit as claimed in claim 1, wherein the prefilter is configured as a rigid element.

3. The delivery unit as claimed in claim 1, wherein the casing of the swirl pot is configured to mate with a base plate, and the prefilter at least partially covers the base plate.

4. The delivery unit according to claim 3, wherein the base plate is sealingly fastened to the casing.

5. The delivery unit according to claim 1, wherein the prefilter is arranged transversely in the casing.

6. The delivery unit according to claim 1, wherein the prefilter comprises a plurality of webs, the plural webs arranged inclined with respect to each in order to form a mesh of the prefilter.

7. The delivery unit according to claim 3, wherein a fine filter housing is manufactured as one piece with the casing, the fine filter housing being closed at one end by the base plate.

8. The delivery unit according to claim 7, wherein the prefilter surrounds the housing of the fine filter.

9. The delivery unit according to claim 7, wherein a plurality of stiffening ribs are arranged on the fine filter housing, the plural stiffening ribs being manufactured as one piece with the fine filter housing are arranged parallel to the casing.

10. The delivery unit according to claim 1, further comprising:
    at least one supporting element configured to support at least one component in the swirl pot; and
    at least one connector configured to provide a fluid connection to at least one component of the fuel delivery unit in the swirl pot,
    wherein the prefilter surrounds the at least one connector and the at least one supporting element.

11. The delivery unit as claimed in claim 2, wherein the casing of the swirl pot is configured to mate with a base plate, and the prefilter at least partially covers the base plate.

12. The delivery unit as claimed in claim 1, wherein the prefilter is at least partially encapsulated by a material used to manufacture the swirl pot, thereby forming the cohesive material joint.

\* \* \* \* \*